US012284238B2

(12) United States Patent
Muthukumar (10) Patent No.: US 12,284,238 B2
(45) Date of Patent: Apr. 22, 2025

(54) CALL SETUP FOLLOWING A DEDICATED BEARER FAILURE

(71) Applicant: T-Mobile USA, Inc., Bellevue, WA (US)

(72) Inventor: Praveen Singaram Muthukumar, Lawrenceville, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 518 days.

(21) Appl. No.: 17/748,971

(22) Filed: May 19, 2022

(65) Prior Publication Data

US 2023/0379376 A1    Nov. 23, 2023

(51) Int. Cl.
*H04L 65/65* (2022.01)
*H04B 1/74* (2006.01)
*H04L 65/1069* (2022.01)
*H04L 65/1104* (2022.01)

(52) U.S. Cl.
CPC .............. *H04L 65/65* (2022.05); *H04B 1/74* (2013.01); *H04L 65/1069* (2013.01); *H04L 65/1104* (2022.05)

(58) Field of Classification Search
CPC . H04L 65/65; H04L 65/1104; H04L 65/1069; H04B 1/74
See application file for complete search history.

(56) References Cited

U.S. PATENT DOCUMENTS

| 2019/0223070 A1* | 7/2019 | Lu | H04W 72/56 |
| 2020/0045770 A1* | 2/2020 | Hu | H04W 4/24 |
| 2020/0245209 A1* | 7/2020 | Patil | H04W 36/00698 |

\* cited by examiner

*Primary Examiner* — Brenda H Pham
(74) *Attorney, Agent, or Firm* — Lee & Hayes, P.C.

(57) ABSTRACT

Techniques for setting up a communication session responsive to a dedicated bearer failure are described herein. A telecommunications network can implement a server to determine that a user equipment (UE) is incapable of establishing a communication session using a dedicated bearer due to a bandwidth or technology used by the UE. The server can exchange a user plane message with the UE using a default bearer based on determining that the dedicated bearer failed to establish the communication session. The server can establish the communication session for the UE based at least in part on the user plane message associated with the default bearer.

20 Claims, 6 Drawing Sheets

CALL SETUP FOLLOWING A DEDICATED BEARER FAILURE

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Setting up a call in a telecommunications network can include implementing a default bearer to establish IMS core control signaling and a dedicated bearer to route packets between the IMS core and a UE. However, the dedicated bearer can fail or otherwise be unable to exchange packets between the IMS core and the UE. Further, fallback to another telecommunications network (e.g., 2G, 3G, etc.) may not be available. Thus, an alternate solution is required to establish a call after a dedicated bearer failure to ensure that a voice or video call (e.g., an emergency call) can be established.

This application relates to techniques for establishing a call responsive to a dedicated bearer failure. For example, attempts to exchange messages between a UE and an IMS core can fail due to inconsistencies in network bandwidth and unavailability to fallback to a switched network (2G/3G). The call setup techniques can include determining that the UE and/or the IMS core are unable to establish a dedicated bearer and causing the UE and the IMS core to exchange a default bearer message using packets associated with Real-Time Transport Protocol (RTP) and/or Real-Time Control Transport Protocol (RTCP). Instead of the UE being unable to establish the call by continuing to attempt to connect with the dedicated bearer, the UE can determine or otherwise receive an indication that the dedicated bearer cannot be established. Responsive to determining that the dedicated bearer cannot be established, the UE (or the IMS core) can configure a message for sending to the IMS core (or the UE) using the default bearer in accordance with RTP and/or RTCP. The IMS core can establish a communication channel usable to exchange data packets for voice and data communication based at least in part on receiving the message using the default bearer. By implementing the call setup techniques, a call can be completed on an LTE network or a 5G network including when fallback to another network is not available or when the dedicated bearer cannot be used.

Generally, the call setup techniques described herein can include implementing one or more components to manage messages between a UE and an IMS core (also referred to as an IMS) usable to establish a control plane and/or a user plane sufficient for the UE to send and/or receive a call. The one or more components implementing the call setup techniques described herein can represent firmware, hardware and/or software and can be included in the UE, the IMS, or portions thereof. For instance, the one or more components can include a dedicated bearer failure detector configured to identify, detect, or otherwise determine that the dedicated bearer is unusable to establish a user plane and therefore unable to establish a call. The dedicated bearer failure detector can also or instead determine that the UE is associated with a network bandwidth that is incompatible with the dedicated bearer.

The one or more components can also or instead include a message management component configured to generate, send, receive, or otherwise manage messages usable to establish the control plane and/or the user plane whether using dedicated bearer, default bearer, or another approach. In some examples, the UE and/or the IMS can implement the message management component to generate or send a user plane message using a default bearer. For example, the message management component can send a Create Bearer Response, a Create Bearer Request, a Default Bearer Context Setup Response, a Default Bearer Context Setup Request, a diameter message, or other user plane message using the default bearer. The user plane message can be configured by the message management component for sending using the Real-Time Transport Protocol (RTP) and/or Real-Time Control Transport Protocol (RTCP). For instance, the message management component can establish the user plane by exchanging message(s) that use RTP and/or RTCP with the default bearer. In various examples, establishing the user plane enables the UE to communicate (e.g., exchange packets associated with one or more messages) with another UE. By implementing the one or more components as described herein, an emergency call (or other call) from the UE can be completed using a communication session (also referred to as a communication channel) that is established based at least in part on using RTP and/or RTCP with the default bearer thereby leading to fewer dropped calls, less time to connect devices, and improved customer satisfaction.

When the default bearer cannot support the UE due to, for example, a technological deficiency of the UE, a server employing the aforementioned one or more components can send a user plane message (e.g., a Create Bearer Request) to the UE to enable the UE to communicate using the default bearer to establish a call. The server can, for instance, be associated with an IMS of a 5G telecommunications network or a 4G telecommunications network. By implementing the server to perform the functionality described herein, a communication session can be established in less time and with a higher success rate (fewer dropped calls) relative to not implementing the server.

Generally, the server can represent functionality to generate, manage, and exchange messages that establish a communication session for a UE after attempts to connect using the dedicated bearer are unsuccessful. For instance, the server of the 5G telecommunication network can receive a call setup request message from a UE, and setup a control plane followed by setting up a user plane. The server can represent firmware, hardware and/or software that receives an initial call setup request (e.g., a Session Initiation Protocol (SIP) INVITE message) to establish a voice communication (e.g., a Voice over New Radio (VoNR) voice call or a VoNR emergency call) and generates a message (e.g., a user plane message) for sending to the UE to establish a communication session usable to exchange data with another UE. The server can send the message to the UE after determining that the UE lacks the software, hardware, and/or firmware to establish a call using the dedicated bearer.

In some examples, the server can represent a Proxy Call Session Control Function (PCSCF) of an IP Multimedia Subsystem (IMS) core configured to manage control plane messages and/or user plane messages associated with a call request from a UE. For example, the server can determine whether a radio channel, a radio technology, and/or a chipset of the UE is sufficient for establishing the dedicated bearer, and if not, determine a protocol for using in the default bearer to connect the UE with another UE.

In some examples, the server can generate one or more message(s) for sending to a base station of the 5G network, a base station of the 4G network, an Access and Mobility Management Function (AMF), a Mobile Management Entity (MME), a gateway, to name a few. The one or more messages can ensure that the base station of the 5G network, the base station of the 4G network, the AMF, and/or the MME exchange data efficiently. Further description of communication setup techniques by the server can be found throughout this disclosure including in the figures below.

Figure 1:
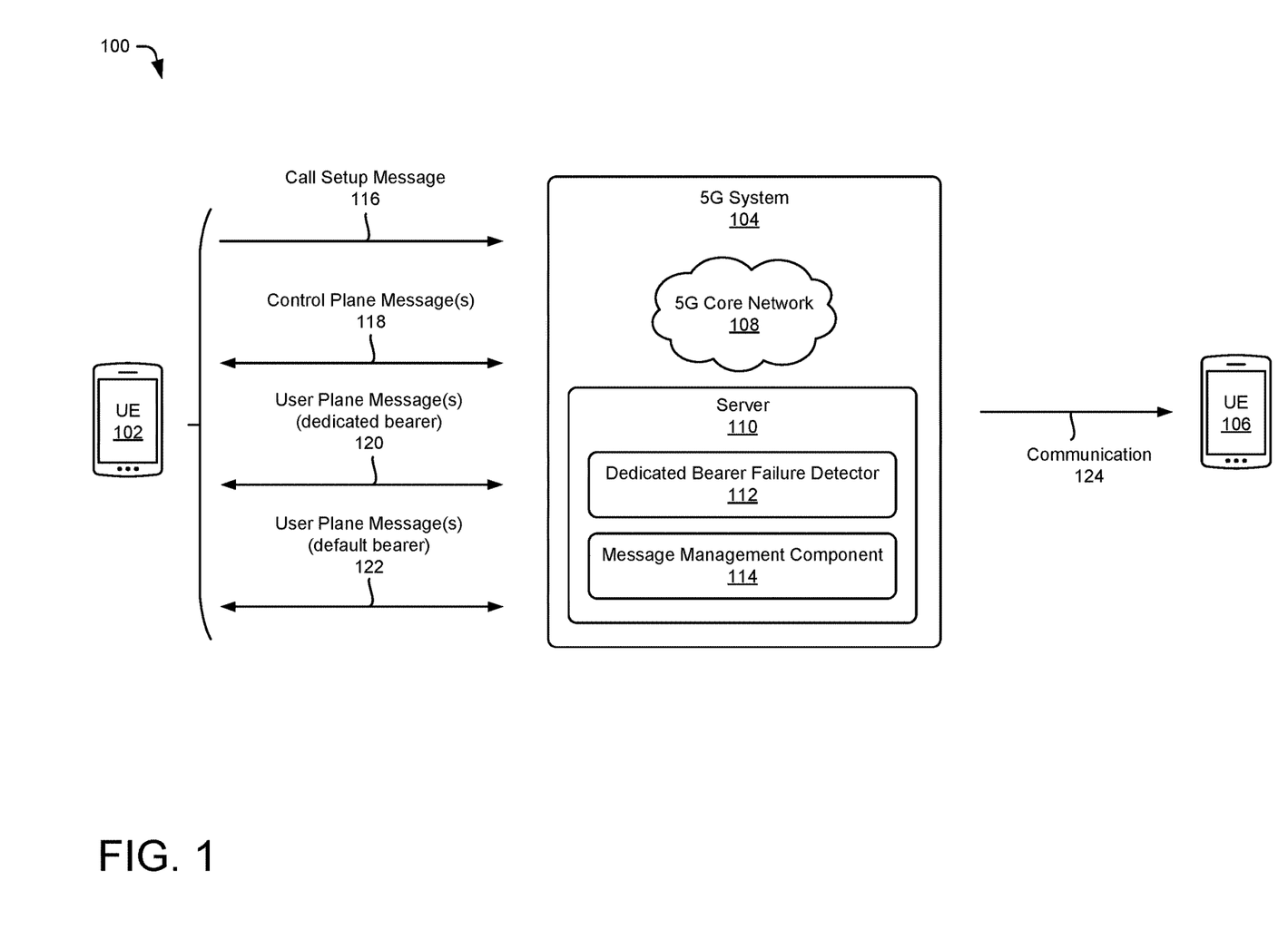
FIG. 1 depicts an example network environment in which an example user equipment (UE) can connect to a telecommunication system to engage in a voice communication.

FIG. 1 depicts an example network environment 100 in which an example user equipment (UE) can connect to one of multiple available telecommunications systems to engage in a voice communication. For example, a UE 102 can connect to a 5G system 104 to exchange a voice communication (e.g., a VoNR communication, an e911 voice communication, etc.) with one or more additional UEs (e.g., UE 106). In some examples, the UE 102 can connect to a 4G system, or other telecommunications system.

The UE 102 and the UE 106 represent any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, a Machine to Machine device (M2M), a vehicle, an unmanned aerial vehicle (UAV), an Internet of Things (IoT) device, or any other type of computing or communication device. An example architecture for the UE 102 and UE 106 is illustrated in greater detail in FIG. 6.

As depicted in FIG. 1, the 5G system 104 comprises a 5G core network 108 and a server 110 to establish a communication session between the UE 102 and the UE 106 using a default bearer that implements a predetermined protocol (e.g., RTP, RTCP, etc.). Generally, the server 110 can represent an IP Multimedia Subsystem (IMS), or component thereof such as a PCSCF. To implement the call setup techniques described herein, the server 110 can implement a dedicated bearer failure detector 112 and a message management component 114. For example, the UE 102 can initiate a call setup procedure (e.g., an exchange of a plurality of messages that establish the communication channel) by sending a call setup message 116 to establish a voice call to the 5G system 104. The call setup procedure can include, for instance, establishing a control plane and a user plane that enables the UE 102 to exchange data (e.g., data packets for a voice or video call) with the UE 106.

In various examples, the 5G system 104 can initiate, establish, maintain, format, augment, manage, or otherwise determine secure exchange of text, video, and/or photos including configuring the communication 124 to communicate with the UE 106.

In some examples, the server 110 and/or the UE 102 can generate one more control plane messages 118 to establish a control plane between the server 110 and the UE 102 using a default bearer (e.g., a Create Session Response, a Session Initiation Protocol (SIP) message, or the like). Based at least in part on exchanging the control plane message(s) 118, the control plane can be successfully established and the UE 102 and the server 110 can generate one or more user plane message(s) 120 (e.g., a Create Bearer Request, a Create Bearer Response, a Dedicated Bearer Context Setup Request, a Dedicated Bearer Context Setup Response, a diameter message, and so on) to establish a user plane for the communication channel using the dedicated bearer.

The dedicated bearer failure detector 112 can be configured to determine whether the dedicated bearer can be established between the UE 102 and the server 110. For instance, the dedicated bearer failure detector 112 can determine that a user plane message 120 was not received from the UE 102, or that the user plane message 120 from the UE 102 is requesting a network bandwidth that the dedicated bearer does not provide. In some examples, the dedicated bearer failure detector 112 can output an indication that the user plane message 120 will not result in establishing the user plane using the dedicated bearer. Accordingly, the dedicated bearer failure detector 112 can send an indication (that the dedicated bearer was not successful in establishing the user plane) to the message management component 114.

The message management component 114 can represent functionality to generate one or more user plane message(s) 122 to establish the user plane for the communication channel using the default bearer based at least in part on the indication that the dedicated bearer was not successful in establishing the user plane. Thus, instead of the UE 102 repeatedly sending messages to the dedicated bearer or receiving a drop call signal, the message management component 114 can initiate generating and/or sending the user plane message(s) 122 (e.g., a Create Bearer Request, a Create Bearer Response, a Default Bearer Context Setup Request, a Default Bearer Context Setup Response, a diameter message, and so on) using the default bearer (which may include RTP and RTCP packets). In some examples, the message management component 114 can cause the user plane to be established using the default bearer. Once the control plane and the user plane are established, the server 110 can establish the communication channel for exchanging data with the UE 106 including sending a communication 124.

In various examples, the message management component 114 can provide functionality to generate, send, or receive the control plane message(s) 118, the user plane message(s) 120 (dedicated bearer), and/or the user plane message(s) 122 (default bearer). The message management component 114 can also determine a protocol for using to send and/or receive the control plane message(s) 118, the user plane message(s) 120 (dedicated bearer), and/or the user plane message(s) 122 (default bearer). In some examples, the message management component 114 can determine to use an RTP and/or an RTCP to exchange the user plane message(s) 122 (default bearer). In some examples, the communication channel can exchange data (e.g., the communication 124) using use the RTP and/or the RTCP over the default bearer.

In some examples, the dedicated bearer failure detector 112 and the message management component 114 can be included in the UE 102, the UE 106, or another component or entity of the 5G system 104. For example, functionality provided by the dedicated bearer failure detector 112 and/or the message management component 114 can be implemented by the UE 102 or the UE 106, in addition to or instead of the server 110.

In various examples, the message management component 114 can determine that fallback to another telecommunications network is unavailable, and generate the user plane message(s) 122 associated with the default bearer based at least in part on determining that that fallback to the other telecommunications network is unavailable. For example, the message management component 114 can receive an indication from an entity associated with the 5G core network 108 that a switched network (2G, 3G, etc.) is not available to transfer a call setup request from the UE 102 upon the dedicated bearer being unable to establish the call.

The dedicated bearer can fail to establish a user plane for a variety of reasons. For example, the UE can request using a bandwidth, frequency, or other parameter that the dedicated bearer does not support. In other examples, the dedicated bearer can fail due to a user plane message being associated with a frequency or technology that the dedicated bearer and/or the UE 102 does not support (e.g., the telecommunication network does not support a bandwidth associated with the UE 102). For example, the dedicated bearer failure detector 112 can identify a radio frequency band or a radio technology for the UE 102 to establish the communication channel using the dedicated bearer, compare the radio frequency band or the radio technology to a frequency band or a technology of the UE 102, and determine that the communication channel or the user plane cannot be established using the dedicated bearer based at least in part on the comparison.

In some examples, the dedicated bearer can fail to establish a user plane based at least in part on a configuration error caused by a setting of the telecommunication network and/or the UE 102. For example, a configuration error associated with a network setting of the telecommunication network can cause a call to fail over dedicated bearer.

In various examples, the dedicated bearer can fail after being established, and the techniques described herein can be implemented to continue the call using the default bearer. For instance, after the UE 102 accepts the dedicated bearer request, and after the dedicated bearer is formed, the dedicated bearer can be lost due to a network configuration, a UE configuration, a firmware failure associated with the UE 102, or other reason. The UE 102 may, for example, send a message to the IMS indicating that "UE Dedicated Bearer Lost" as a result of a firmware failure (e.g., an incorrect firmware update), or other failure by the UE 102. Upon detecting that an established dedicated bearer is lost or otherwise terminated, or about to be lost, the message management component 114 can configure the default bearer for exchanging RTP and RTCP packets thereby continuing a call that would otherwise be lost when the communication session ends due to the dedicated bearer failure.

The dedicated bearer failure detector 112 can represent functionality to intercept the control plane message(s) 118 and/or the user plane message(s) 120 (dedicated bearer) and extract, detect, or otherwise determine device information associated with the UE 102. Generally, the dedicated bearer failure detector 112 can identify, detect, or otherwise determine that the UE 102 is requesting a voice call (e.g., a Voice over New Radio (VoNR) communication over the 5G core network 108 or a Voice over LTE communication over the 4G core network). In various examples, the dedicated bearer failure detector 112 can compare the device information (e.g., a P-Access-Network-Information (PANI), an International Mobile Equipment Identity (IMEI), etc.) to a table, a list, or other data stored in memory that identifies a chipset, a radio frequency, or other capability of the UE 102, and determine, based on the comparing, that the UE 102 is incapable of completing a voice call over the dedicated bearer.

Based at least in part on the device information indicating that the UE 102 is unable to establish a voice call (e.g., a VoNR call, a VoLTE call, etc.) over the dedicated bearer, the message management component 114 can generate the user plane message(s) 122 (default bearer) indicating that the UE 102 is to initiate connection to the user plane using the default bearer. The message management component 114 can configure the user plane message(s) 122 for a particular protocol (e.g., RTP, RTCP, etc.) when using the default bearer.

In addition to generating the control plane message(s) 118, the message management component 114 can generate, manage, or otherwise determine one or more messages usable to establish the dedicated bearer or the default bearer with other components of a telecommunication network. In some examples, the message management component 114 can generate a message for sending to an AMF, MME, PCF, PCSF, a base station, or other entity of the 5G system 104 (or a 4G system), in order to coordinate a series of messages that together establish the communication session. In some examples, the message management component 114 can generate a message to notify a base station that fallback to the 4G system is not possible. In this way, the base station is made aware to avoid sending fallback messages and instead initiate exchanging one or more messages using the default bearer.

In various examples, the message management component 114 can determine that a message was not generated, sent, or received for a time period. For example, the message management component 114 can determine than the UE 102 failed to send a Dedicated Bearer Context Setup Response message for the time period (e.g., a few hundred milliseconds, a few seconds, etc.) based at least in part on the server 110 sending a user plane message 120 (dedicated bearer) and not receiving a response from the UE 102. In this example, the message management component 114 can determine that the dedicated bearer is not operating to establish the communication channel based at least in part on the message not being received for the time period.

To implement the techniques described herein, in various examples the 5G system 104 and/or the server 110 can include one or more of: an a proxy call session control function (PCSCF), an interrogating call session control function (ICSCF), a serving call session control function (SCSCF), a serving gateway (SGW), a packet data network gateway (PGW), a policy and charging rules function (PCRF), and an internet protocol short message gateway (IPSM-GW), a short message service center (SMSC), and an evolved packet data gateway (ePDG), and a Home Subscriber Server (HSS), to name a few. In addition, the techniques described herein may be implemented using Real-Time Protocol (RTP) and/or Real-Time Control Protocol (RTCP), among others.

In various examples, the 5G system 104 can represent functionality to provide communications between the UE 102 and the UE 106, and can include one or more radio access networks (RANs), as well as one or more core networks linked to the RANs. For instance, a UE 102 can wirelessly connect to a base station or other access point of a RAN, and in turn be connected to the 5G core network 108. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, third generation (3G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, Wi-Fi technology, and/or any other previous or future generation of radio access technology. In this way, the 5G system 104 is compatible to operate with other radio technologies including those of other service providers. Accordingly, the call setup message 116 from the UE 102 may originate with another service provider (e.g., a third-party) and be processed by the IMS independent of the technolog(ies) or core network associated with the service provider.

In some examples, the 5G core network 108 can represent a service-based architecture that includes multiple types of network functions that process control plane data and/or user plane data to implement services for the UE 102. In some examples, the services comprise rich communication services (RCS), a VoNR service, a ViNR service, and the like which may include a text, a data file transfer, an image, a video, or a combination thereof. The network functions of the 5G core network 108 can include an Access and Mobility Management Function (AMF), a Session Management Function (SMF), a User Plane Function (UPF), a Policy Control Function (PCF), and/or other network functions implemented in software and/or hardware, to name a few. Examples of network functions are also discussed in relation to FIG. 2, and elsewhere.

Figure 2:
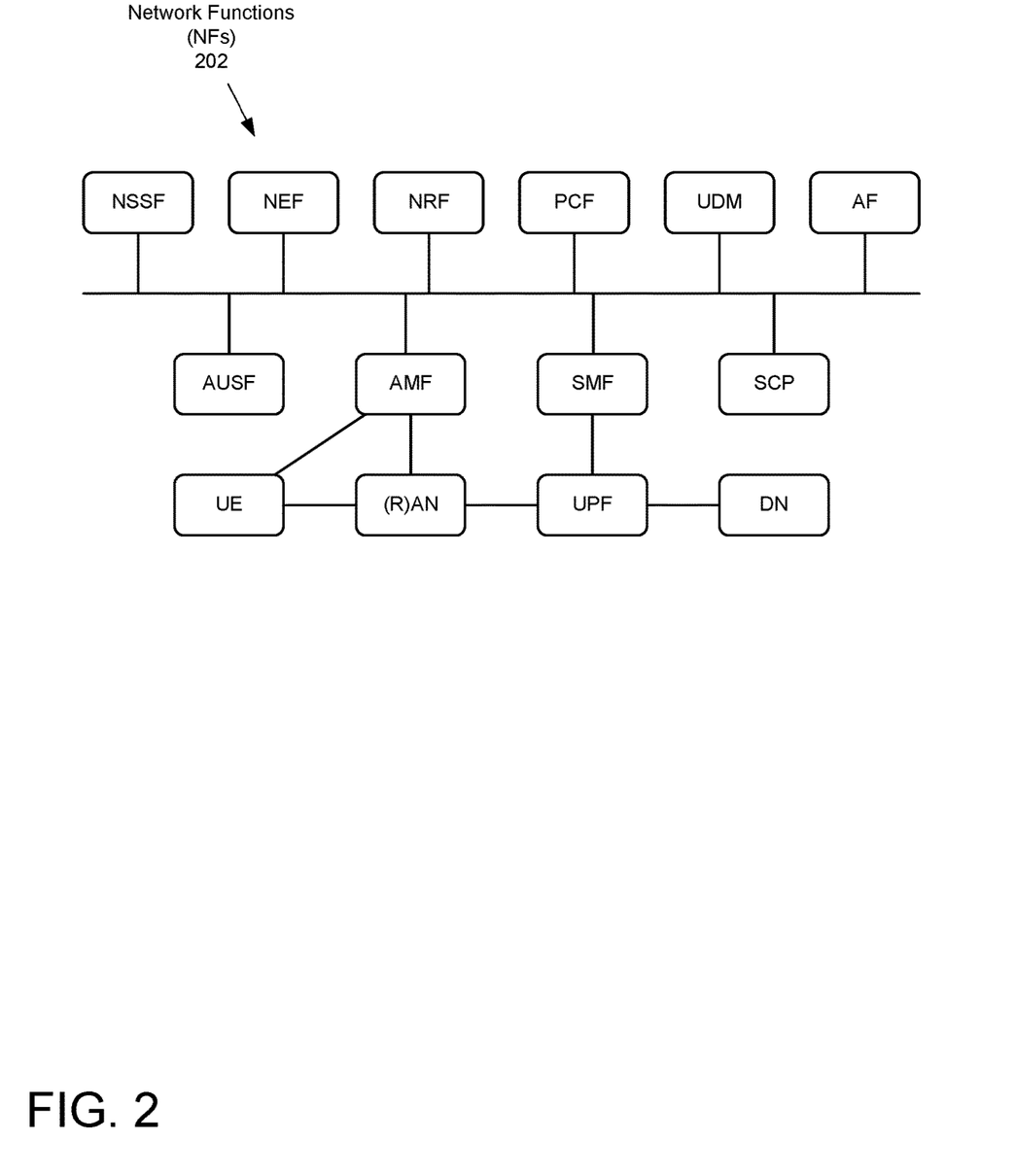
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 108 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 108), including but not limited to an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G core network 108 can be implemented as network applications that execute within containers (not shown). The NFs 202 can execute as hardware elements, software elements, and/or combinations of the two within telecommunication network(s), and accordingly many types of the NFs 202 can be implemented as software and/or as virtualized functions that execute on cloud servers or other computing devices. Network applications that can execute within containers can also include any other type of network function, application, entity, module, element, or node.

The 5G core network 108 can, in some examples, determine a connection between an IMS that manages a communication session for the UE 102, including sessions for short messaging, voice calls, video calls, and/or other types of communications. For example, the UE 102 and the IMS of the 5G system 104 can exchange Session Initiation Protocol (SIP) messages to set up and manage individual communication sessions. In some examples, the IMS of the 5G system 104 can generate a communication channel for a voice communication between the UE 102 and the UE 106.

Figure 3:
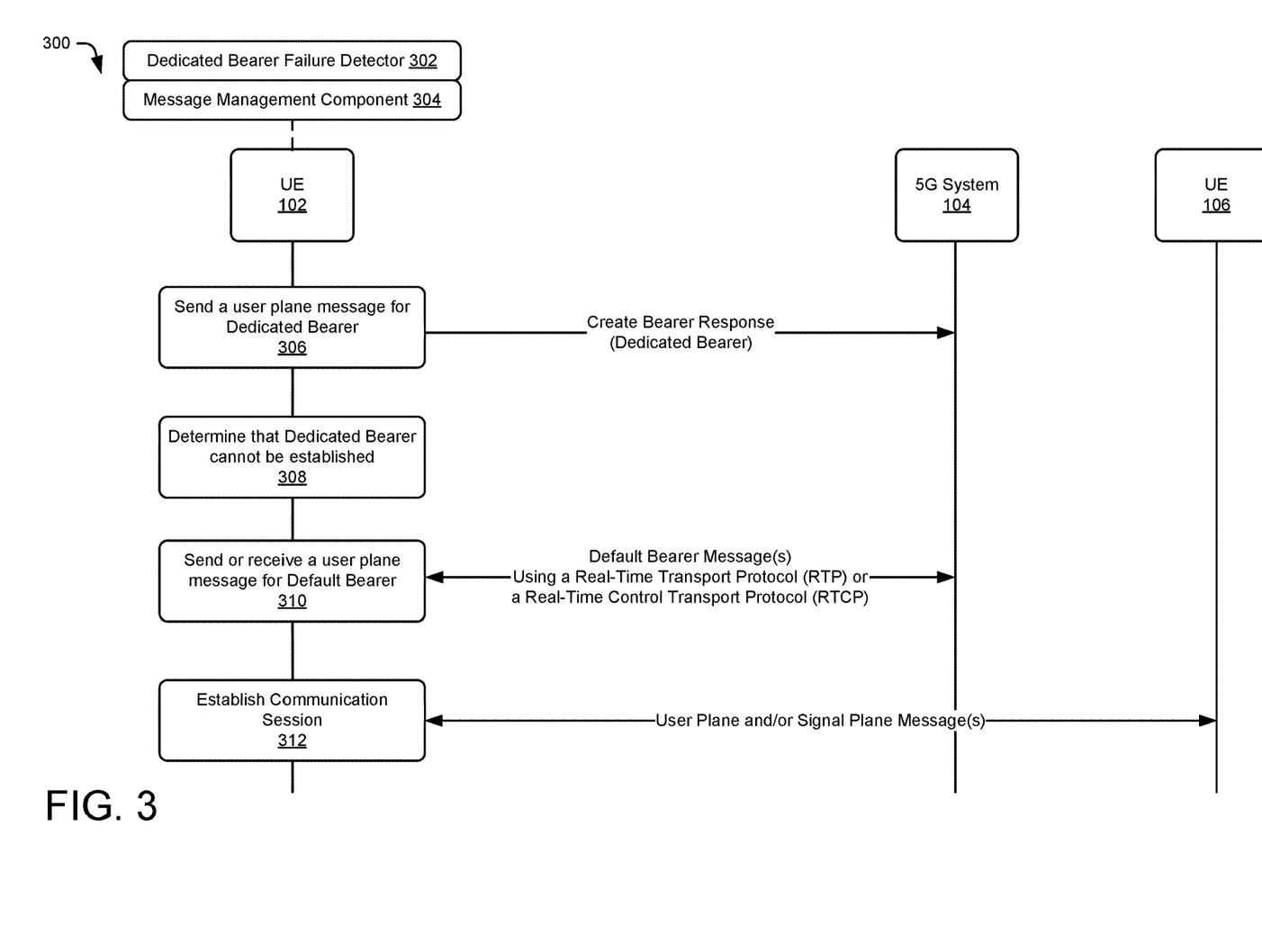
FIG. 3 depicts an example user equipment (UE) implementing call setup techniques to establish a communication session in an example telecommunication network.

FIG. 3 depicts an example user equipment implementing call setup techniques 300 to establish a voice call in an example telecommunication system. For example, the UE 102 of FIG. 1 may exchange (e.g., send and/or receive) one or more call setup messages with the 5G system 104 to establish a communication session with another UE (e.g., the UE 106). FIG. 3 depicts the UE 102 comprising a dedicated bearer failure detector 302 and a message management component 304. The dedicated bearer failure detector 302 can be configured similar to the dedicated bearer failure detector 112 and the message management component 304 can be configured similar to the message management component 114.

In some examples, the 5G system 104 can comprise the dedicated bearer failure detector 112 and the message management component 114. For example, the 5G system 104 can include the dedicated bearer failure detector 112 and the message management component 114 in an IMS, a PCSCF, or other component of the 5G system 104 that is configured to determine a communication channel for a voice call initiated by the UE 102. For example, the UE 102 can send a message requesting the communication channel to the IMS of the 5G system 104. The IMS can establish a control plane by exchanging control plane messages with the UE 102. The UE 102 and the IMS can exchange one or more message(s) (e.g., a diameter message, a Create Session Request, a Create Session Response, a SIP message, and so on) to successfully establish the control plane (e.g., complete SIP registration of the UE 102). Upon establishing the control plane, the IMS and the UE 102 can exchange message(s) to establish a dedicated bearer. For instance, the IMS can send the UE 102 a message indicating a request to create a dedicated bearer. Given that the control plane is established (e.g., using a default bearer), the request to create the dedicated bearer sent from the IMS to the UE 102 can include a message to establish a user plane for allowing transfer of one or more user plane audio packets and/or user plane video packets. A message usable to establish or maintain the user plane can be referred to herein a user plane message.

At 306, the UE 102 can send a user plane message for establishing dedicated bearer over the 5G core network 108 to the IMS of the 5G system 104. For example, the UE 102 can send a message (e.g., a Create Bearer Response, a Dedicated Bearer Context Setup Response, etc.) indicating a response to the request to create the dedicated bearer from the IMS of the 5G system 104.

The message management component 114 can identify a P-Access-Network-Information (PANI), an International Mobile Equipment Identity (IMEI), or other device identifier in a message associated with setting up the control plane (e.g., a SIP message used during establishing the control plane), a message associated with setting up the user plane, or other message from the UE 102 usable to determine whether the UE 102 includes hardware, software, and/or firmware sufficient for establishing a communication channel using dedicated bearer for a VoNR call or ViNR call over the 5G core network 108. In some examples, the UE 102 can be operating on the 5G core network 108 but lack a chipset, memory, processor, or other computational resource sufficient for establishing the VoNR call using the dedicated bearer. The message management component 114 can compare information associated with the PANI, the IMEI, or other device identifier, with a list of devices that are unable to establish a dedicated bearer based on a difference between a radio frequency or radio technology of the UE 102 and a radio frequency or a radio technology of the dedicated bearer.

At 308 the UE 102 can determine that dedicated bearer cannot be established (e.g., the dedicated bearer failure detector 302 can determine the UE 102 lacks the operational or computational capability to establish the dedicated bearer). Responsive to sending the user plane message at 306, the UE 102 can, at 308, determine that one or more radio frequency bands of the dedicated bearer and available radio frequency bands of the UE 102 are incompatible for establishing the communication session using the dedicated bearer.

Generally, the operation at 308 can represent the UE 102 implementing the dedicated bearer failure detector 302 and the message management component 304 to detect whether the IMS successfully established the dedicated bearer.

Based on the dedicated bearer failure detector 302 determining that the dedicated bearer cannot be established, the UE 102 can send or receive a user plane message for default bearer at 310. For example, the UE 102 (and/or the 5G system 104) can send one or more default bearer messages (e.g., a message to establish or maintain a default bearer) that use a protocol determined by the message management component 304 (e.g., protocols associated with RTP and/or RTCP).

At 312, the UE 102 can establish a communication session. For example, the UE 102 can determine that the default bearer can exchange user plane and/or signal plane messages with the UE 106. In various examples, the UE 102 can establish the communication session at 312 using the user plane established between the UE 102 and the 5G system 104. For instance, the operation 312 can include the UE 102 exchanging message(s) with the 5G system 104 (or a component thereof) and/or the UE 106 to establish a user plane and/or a signal plane usable as part of the communication session. In some examples, establishing the communication session at 308 can include one or more message exchanges by the AMF, the MME, the PCF, the UE, a base station of the 5G system 104, and/or a base station of a 4G system, etc.

While FIG. 3 shows message data exchanging between the dedicated bearer failure detector 302, the message management component 304, and the 5G system 104, it is understood that the message data can also or instead be exchanged between a component of the 5G system 104 (e.g., an IMS, a PCSCF, a base station or other network element, the dedicated bearer failure detector 112, the message management component 114, etc.) and a component of the UE 102 (e.g., the dedicated bearer failure detector 302, the message management component 304, etc.).

Though the dedicated bearer failure detector 302 and the message management component 304 are illustrated in FIG. 3 individually, it is understood that the dedicated bearer failure detector 302 and the message management component 304 (or functionality provided therefrom) may be directly coupled to and/or integrated into an IMS of the 5G system 104 and/or a component of the UE 102. In one specific example, the call setup techniques described herein can be implemented as logic (e.g., programmable code) stored in a PCSCF of the 5G system 104 and/or in memory of the UE 102.

Figure 4:
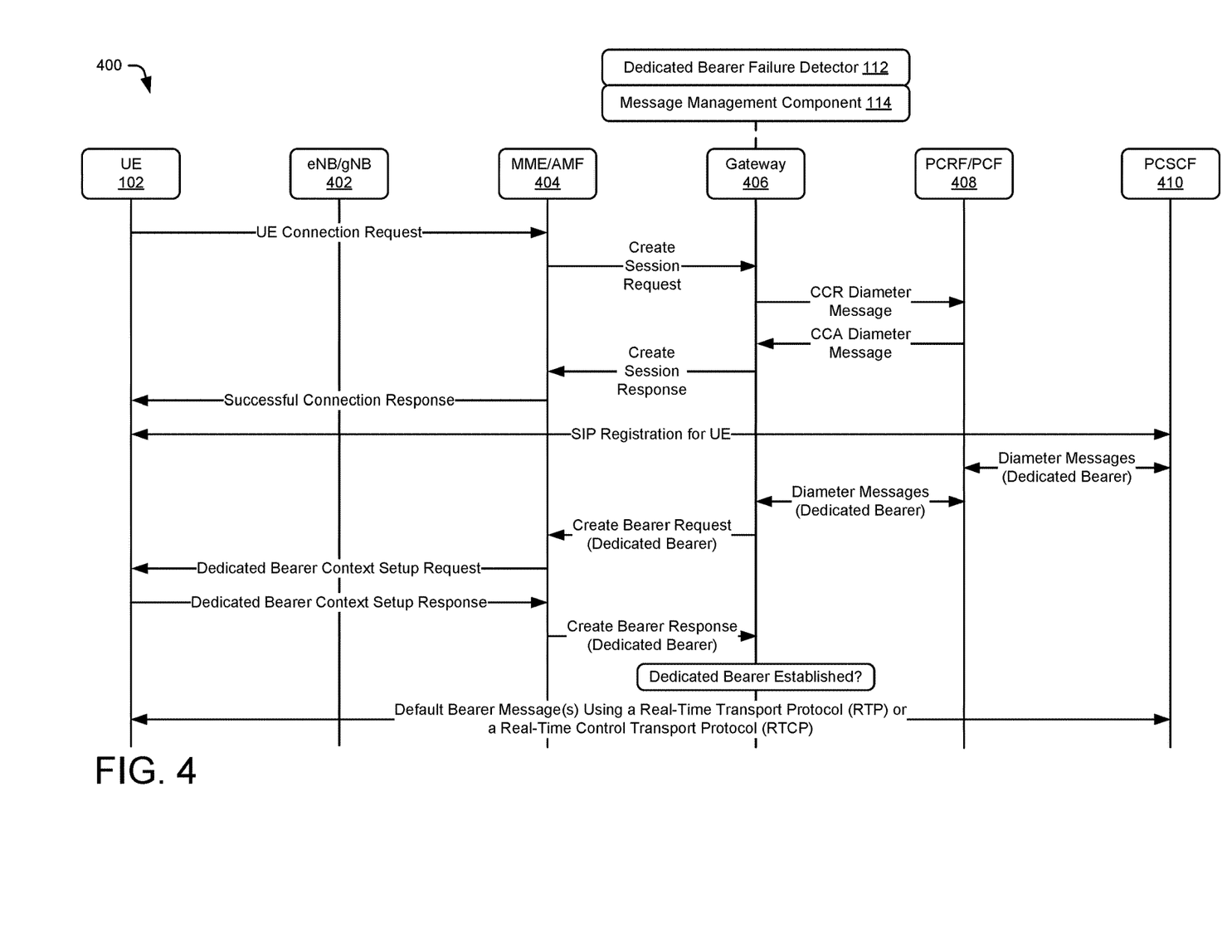
FIG. 4 depicts a messaging flow during an example call setup through an example Proxy Call Session Control Function (PCSCF).

FIG. 4 depicts a messaging flow 400 during an example call setup through an example Proxy Call Session Control Function (PCSCF). For instance, the UE 102 can initiate a connection request to another UE using the 5G core network 108. In some examples, the messaging flow 400 as shown in FIG. 4 can represent activity to establish a communication session between the UE 102 and the UE 106 by exchanging messages between the UE 102, an eNB/gNB 402, an MME/AMF 404, a gateway 406, a PCRF/PCF 408, and a PCSCF 410. In various examples, the PCSCF 410 can include functionality of the server 110, the dedicated bearer failure detector 112, and the message management component 114. In some examples, the UE 102 can include the dedicated bearer failure detector 302 and the message management component 304. As shown in FIG. 4, the gateway 406 can include the functionality associated with the dedicated bearer failure detector 112 and the message management component 114.

The messaging flow 400 can include the UE 102 initiating a voice call by sending UE connection request to the MME/AMF 404 via the eNB/gNB 402. In examples where a 5G core network is used, the UE 102 can send the request to the gNB 402 and the AMF 404. In examples where a 4G core network is used, the UE 102 can send the request to the eNB 402 and the MME 404. Thus, depending on the telecommunications network, only one of the MME or the AMF, or one of the eNB or the gNB may be used in implementations.

The MME/AMF 404 can generate and send a Create Session Request to the gateway 406. The gateway 406 can represent one of: a System Architecture Evolution Gateway (SAEGW), a Packet Data Network Gateway (PGW), a Session Management Function (SMF), a User Plane Function (UPF), a Serving Gateway (SGW), or the like depending on which telecommunications network (5G, 4G, 3G, etc.) is used by the UE 102. For example, the gateway 406 can represent an SMF and/or a UPF in examples when the telecommunication network is a 5G core network, and the gateway can represent an SGW and/or a PGW In some examples, the message flow 400 can include the gateway 406 determining and sending a diameter message (e.g., a Credit Control Request (CCR) diameter message) to the PCRF/PCF 408. In examples that a 5G core network is used the UE 102 can send the diameter message to the PCF 408 while in examples that a 4G core network is used the UE 102 can send the diameter message to the PCRF 408. The PCRF/PCF 408 can respond to the diameter message from the gateway 406 by sending another diameter message (e.g., a Credit Control Application (CCA) diameter message) to the gateway 406.

In some examples, the message flow 400 can include the gateway 406 generating and sending a Create Session Response to the MME/AMF 404 which then sends a successful connection response message to the UE 102 (via the eNB/gNB 402). By exchanging the messages noted above, the UE 102 can complete SIP registration or otherwise establish a control plane with the PCSCF 410. Consequently, the PCSCF 410 can exchange diameter messages for dedicated bearer with the PCRF/PCF 408, and the PCRF/PCF 408 can exchange diameter messages for dedicated bearer with the gateway 406 causing the gateway to send a Create Bearer Request for dedicated bearer to the MME/AMF 404. In some examples, the MME/AMF 404 can send a Dedicated Bearer Context Setup Request to the UE 102 thereby causing the UE 102 to send a Dedicated Bearer Context Setup Response to the MME/AMF 404. Based at least in part on receiving the Dedicated Bearer Context Setup Response, the MME/AMF 404 can send a Create Bearer Response for dedicated bearer to the gateway 406.

The message flow 400 can include determining whether the dedicated bearer is established. For instance, the gateway 406 can implement the dedicated bearer failure detector 112 and/or the message management component 114, the PCSCF 410 can implement the dedicated bearer failure detector 112 and/or the message management component 114, and/or the UE 102 can implement the dedicated bearer failure detector 302 and/or the message management component 304 to determine whether the dedicated bearer was, or can be, established based on some or all or the aforementioned messages in FIG. 4. In other words, component(s) of the UE 102, the gateway 406, and/or the PCSCF 410 can determine that a message associated with the call setup procedure was not received, sent, or configured properly to enable the dedicated bearer to be used as part of the communication session.

In some examples, the Create Bearer Response for dedicated bearer received by the gateway 406 can be analyzed by the dedicated bearer failure detector 112 to ensure that the UE 102 and the dedicated bearer are using a compatible network frequency, or other technology, sufficient to establish the dedicated bearer. In other examples, the Create Bearer Response may not be received by the gateway 406 due to a network problem or problem with the UE 102, or the gateway 406, and status of the dedicated bearer can be determined accordingly (e.g., a success status, a failure status, an in process (of being established) status).

In some examples, the message management component 114 can analyze previous messages sent, received, or expected to be received from the UE 102, the eNB/gNB 402, the MME/AMF 404, the gateway 406, the PCRF/PCF 408, and/or the PCSCF 410 as part of a call setup process (e.g., to establish a control plane and/or a user plane). In some examples, the analysis can determine that a message was not sent or received, or that a received message is incompatible for processing by a respective component, and send an indication to the dedicated bearer failure detector 112 which can consider the indication when determining whether the dedicated bearer was established (e.g., determine a status of the dedicated bearer).

In some examples, the determination of whether the dedicated bearer was established can be based at least in part on comparing an output from the dedicated bearer failure detector 112 at the gateway 406 with an output from the dedicated bearer failure detector 112 at the PCSCF 410 and/or the dedicated bearer failure detector 302 at the UE 102. However, in other examples, an output from a respective component or detector associated with one of the UE 102, the gateway 406, or the PCSCF 410 is sufficient to determine that the dedicated bearer was not successful (e.g., is not usable for exchanging packets as part of a communication session with the UE 106).

Based at least in part on dedicated bearer not being established or otherwise failing to provide a communication session between the UE 102 and the UE 106, the message management component 114 or the message management component 304 can generate a message to establish a user plane using default bearer. For example, the UE 102 can employ the message management component 114 to send a default bearer message using a Real-Time Transport Protocol (RTP) or a Real-Time Control Transport Protocol (RTCP), though other protocols may be used instead. In various examples, the gateway 406, the PCSCF 410, or other component, can send a default bearer message to the UE 102, or another component, to cause the user plane to be established using the default bearer. Generally, the default bearer message(s) can represent a diameter message, a Create Bearer Request, a Create Bearer Response, a Dedicated Bearer Context Setup Request, and so on, usable to establish the user plan that failed to establish using the dedicated bearer.

In some examples, the message management component 114 or the message management component 304 can generate the default bearer message(s) (e.g., user plane audio packets, user plane video packets, etc.) for sending using RTP and/or RTCP based at least in part on determining that the dedicated bearer failed or could not be established. Additionally, or alternatively, the message management component 114 or the message management component 304 can generate the default bearer message(s) based at least in part on a determination that fallback is unavailable to the UE 102. Accordingly, the message flow 400 can represent a solution to provide a communication session after a dedicated bearer failure and in examples that fallback to another telecommunications network is not possible (e.g., due to 2G or 3G not being available).

Figure 5:
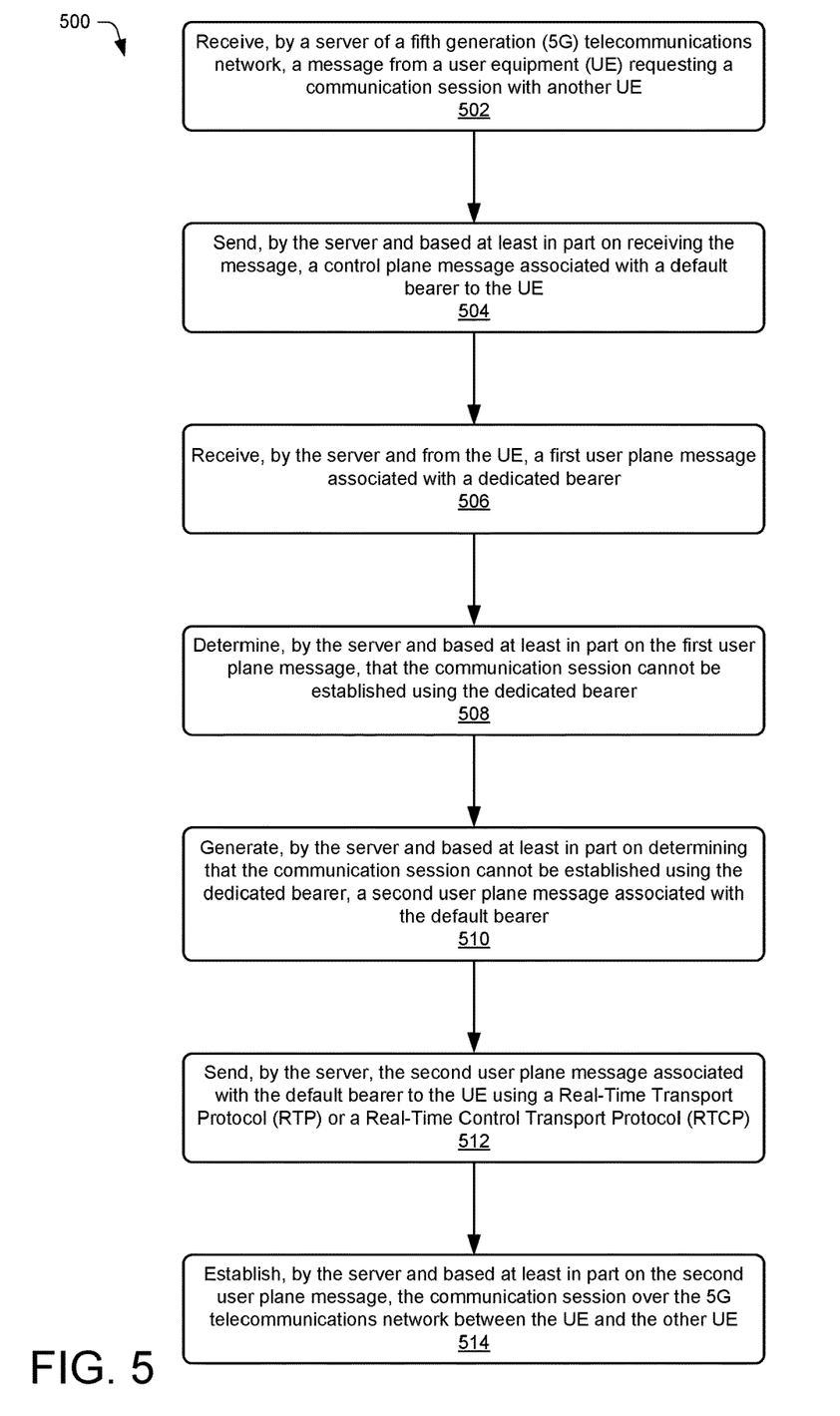
FIG. 5 depicts a flowchart of an example process for establishing a voice call for an example user equipment.

FIG. 5 depicts a flowchart of an example process 500 for establishing a voice call for an example user equipment. Some or all of the process 500 may be performed by one or more components in FIGS. 1-4, as described herein. For example, some or all of process 500 may be performed by the UE 102, the server 110 of FIG. 1, the gateway 406, or the PCSCF 410 of FIG. 4.

At operation 502, the process may include receiving, by a server of a fifth generation (5G) telecommunications network, a message from a user equipment (UE) requesting a communication session with another UE. In some examples, the operation 502 may include the server 110 receiving SIP INVITE message data indicating that the UE initiated a voice call (e.g., a VoNR communication) to another UE and requests that a communication session be established to facilitate the voice call.

At operation 504, the process may include sending, by the server and based at least in part on receiving the message, a control plane message associated with a default bearer to the UE. For instance, the server 110 can send a message indicating a response to the SIP INVITE message to establish a control plane using the default bearer. In various examples, the server 110 can represent an IMS (or a component thereof such as a PCSCF) that is configured to register the UE 102 (e.g., perform SIP registration).

At operation 506, the process may include receiving, by the server and from the UE, a first user plane message associated with a dedicated bearer. In some examples, the operation 506 may include the server 110 receiving a message from the UE 102 to establish a user plane using dedicated bearer. The operation 506 can be based at least in part on the server 110 previously sending a Create Bearer Request to the UE 102, and the operation 506 can include the UE 102 sending a response to the Create Bearer Request (for dedicated bearer).

At operation 508, the process may include determining, by the server and based at least in part on the first user plane message, that the communication session cannot be established using the dedicated bearer. In some examples, the operation 508 may include the server 110 implementing the dedicated bearer failure detector 112 and/or the message management component 114 to determine that the IMS did not establish the dedicated bearer with the UE 102.

In some examples, the operation 508 may include the server 110 determining that the dedicated bearer was not established based at least in part on a device identifier, a radio frequency band or a radio technology usable by the UE to establish the dedicated bearer (or communication session at a future time). In such examples, the server 110 can compare, as a comparison, the radio frequency band or the radio technology of the UE 102 to a frequency band or a technology of the dedicated bearer, and determine that the UE 102 is incapable of establishing the dedicated bearer over the 5G telecommunications network based at least in part on the comparison. That is, the server 110 can compare radio frequency bands or radio technologies available to the UE 102 to radio frequency bands or radio technologies provided by the dedicated bearer to determine that the user plane cannot be established using the dedicated bearer. In one specific example, the UE 102 can request using a network bandwidth that the dedicated bearer does not support or cannot provide resulting the dedicated bearer failure.

At operation 510, the process may include generating, by the server and based at least in part on determining that the communication session cannot be established using the dedicated bearer, a second user plane message associated with the default bearer. In some examples, the operation 510 may include the server 110 generating a message to establish the user plane using the default bearer. In some examples, the server 110 can configure a user plane message for sending to the UE 102 that uses a particular protocol (e.g., RTP and/or RTCP) for the default bearer.

At operation 512, the process may include sending, by the server, the second user plane message associated with the default bearer to the UE using a Real-Time Transport Protocol (RTP) or a Real-Time Control Transport Protocol (RTCP). In some examples, the operation 512 may include the server 110 sending the generated message to the UE 102 usable to establish the user plane using the default bearer. In various examples, one or more other user plane messages can be exchanged to establish the user plane using the default bearer. For example, the PCSCF 410 can send or receive a diameter message (to the PCRF/PCF 408 or the gateway 406), a Create Bearer Request (to the MME/AMF 404), etc. using the default bearer. In some examples, using the default bearer in operation 512 can be based at least in part on the default bearer being established as a result of exchanging a control plane message(s) such as the server 110 sending the control plane message in operation 504. In this way, the default bearer can be used for setting up the user plane upon determining that the communication session cannot be established using the dedicated bearer at operation 510.

At operation 514, the process may include establishing, by the server and based at least in part on the second user plane message, the communication session over the 5G telecommunications network between the UE and the other UE. In some examples, the operation 514 may include providing the communication session (a channel for exchanging packets between the UE 102 and the UE 106) based at least in part on successfully establishing the user plane using the default bearer. In some examples, the communication session between the UE 102 and the UE 106 can utilize the user plane of the default bearer and may further include exchanging a data packet using RTP and/or RTCP.

Figure 6:
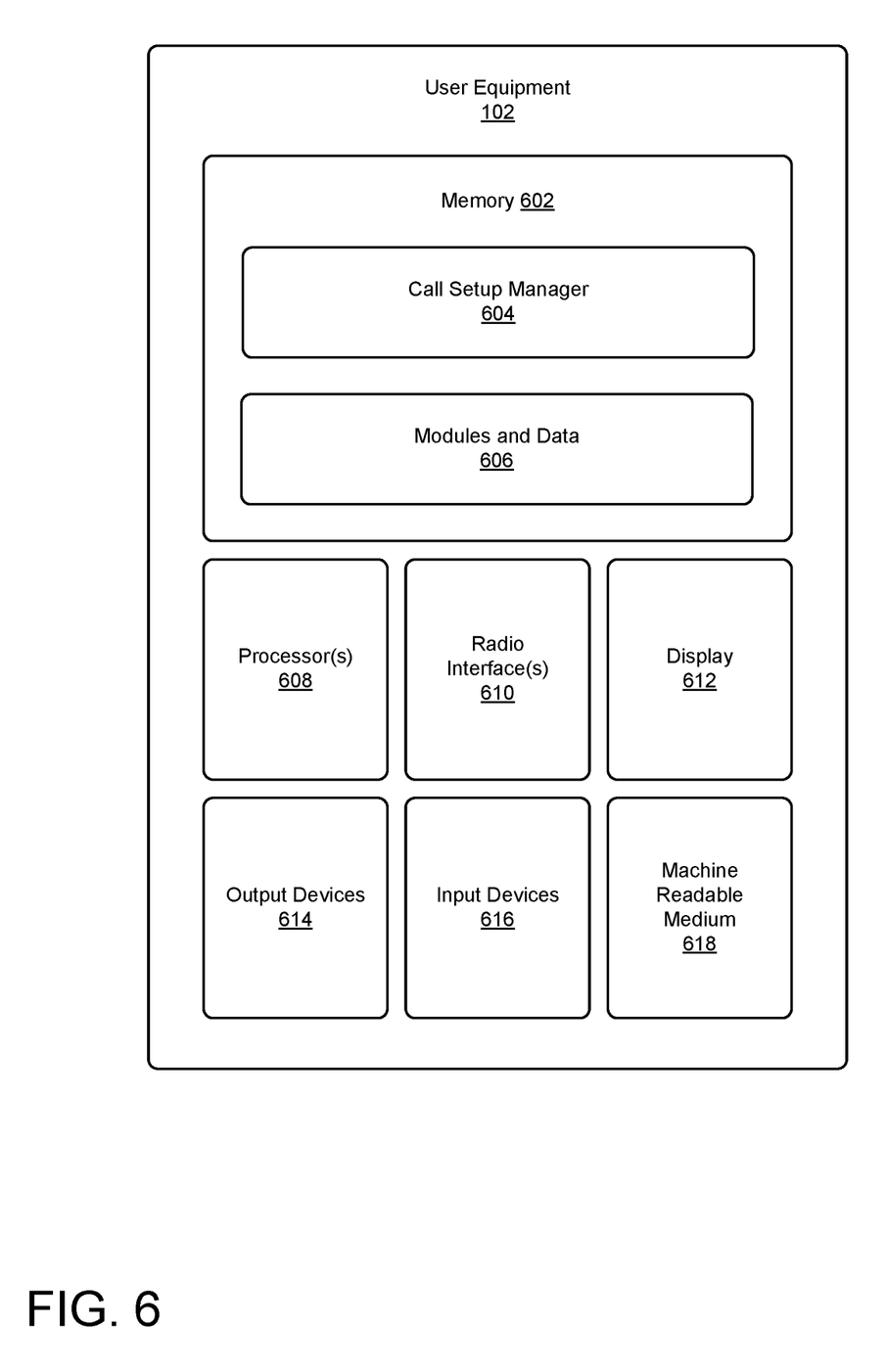
FIG. 6 depicts an example system architecture for a user equipment.

FIG. 6 depicts an example system architecture for a UE 102, in accordance with various examples. As shown, a UE 102 can have memory 602 storing a call setup manager 604, and other modules and data 606. A UE 102 can also comprise processor(s) 608, radio interfaces 610, a display 612, output devices 614, input devices 616, and/or a machine readable medium 618.

In various examples, the memory 602 can include system memory, which may be volatile (such as RAM), non-volatile (such as ROM, flash memory, etc.) or some combination of the two. The memory 602 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 604 can send and/or receive messages comprising a VoNR service, a ViNR service, and/or an RCS service including SIP messages associated with setup and management of a call session via the IMS. The SIP messages can include an SIP INVITE message and/or other SIP messages. The call setup manager 604 can also or instead send and/or receive messages associated with establishing a control plane and/or a user plane.

The other modules and data 606 can be utilized by the UE 102 to perform or enable performing any action taken by the UE 102. The modules and data 606 can include a UE platform, operating system, and applications, and data utilized by the platform, operating system, and applications.

In various examples, the processor(s) 608 can be a central processing unit (CPU), a graphics processing unit (GPU), or both CPU and GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing all computer applications stored in the memory 602, which can be associated with common types of volatile (RAM) and/or nonvolatile (ROM) memory.

The radio interfaces 610 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 610 can be compatible with multiple radio access technologies, such as 5G radio access technologies and 4G/LTE radio access technologies. Accordingly, the radio interfaces 610 can allow the UE 102 to connect to the 5G system 104 and/or a 4G system as described herein.

The display 612 can be a liquid crystal display or any other type of display commonly used in UEs. For example, display 612 may be a touch-sensitive display screen, and can then also act as an input device or keypad, such as for providing a soft-key keyboard, navigation buttons, or any other type of input. The output devices 614 can include any sort of output devices known in the art, such as the display 612, speakers, a vibrating mechanism, and/or a tactile feedback mechanism. Output devices 614 can also include ports for one or more peripheral devices, such as headphones, peripheral speakers, and/or a peripheral display. The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 618 can store one or more sets of instructions, such as software or firmware, that embodies any one or more of the methodologies or functions described herein. The instructions can also reside, completely or at least partially, within the memory 602, processor(s) 608, and/or radio interface(s) 610 during execution thereof by the UE 102. The memory 602 and the processor(s) 608 also can constitute machine readable media 618.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein. For instance, techniques described in FIGS. 5 and 6 can be combined in various ways.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
   receiving, by a server of a fifth generation (5G) telecommunications network, a message from a user equipment (UE) requesting a communication session with another UE;
   sending, by the server and based at least in part on receiving the message, a control plane message associated with a default bearer to the UE;
   receiving, by the server and from the UE, a first user plane message associated with a dedicated bearer;
   determining, by the server and based at least in part on the first user plane message, that the communication session cannot be established using the dedicated bearer;
   generating, by the server and based at least in part on determining that the communication session cannot be established using the dedicated bearer, a second user plane message associated with the default bearer;
   sending, by the server, the second user plane message associated with the default bearer to the UE using a Real-Time Transport Protocol (RTP) or a Real-Time Control Transport Protocol (RTCP); and
   establishing, by the server and based at least in part on the second user plane message, the communication session over the 5G telecommunications network between the UE and the other UE.

2. The method of claim 1, further comprising:
   determining, by the server and based at least in part on the first user plane message, that the UE is associated with a bandwidth or a parameter incompatible with the dedicated bearer or the 5G telecommunications network,
   wherein determining that the communication session cannot be established using the dedicated bearer is further based at least in part on determining that the UE is associated with the bandwidth or the parameter incompatible with the dedicated bearer or the 5G telecommunications network.

3. The method of claim 1, wherein:
the message comprises a Session Initiation Protocol (SIP) message requesting the communication session, and
the first user plane message comprises a Create Bearer Response associated with the dedicated bearer.

4. The method of claim 1, wherein:
the server comprises a proxy call session control function (PCSCF) associated with an Internet Protocol (IP) Multimedia Subsystem (IMS).

5. The method of claim 1, further comprising:
receiving, by the server, a response to the second user plane message associated with the default bearer from the UE using the Real-Time Transport Protocol (RTP) or the Real-Time Control Transport Protocol (RTCP); and
establishing the communication session over the 5G telecommunications network is further based at least in part on the response to the second user plane message from the UE.

6. The method of claim 5, wherein:
the response to the second user plane message from the UE comprises a Create Bearer Response associated with the default bearer.

7. The method of claim 1, wherein determining that the communication session cannot be established using the dedicated bearer comprises:
identifying a radio frequency band or a radio technology for the UE to establish the communication session using the dedicated bearer;
comparing, as a comparison, the radio frequency band or the radio technology to a frequency band or a technology of the UE; and
determining that the communication session cannot be established using the dedicated bearer is further based at least in part on the comparison.

8. The method of claim 1, wherein the message is a first message, the method further comprising:
receiving, by the server and from the UE, a response to the control plane message associated with the default bearer;
establishing, by the server, a control plane associated with the default bearer between the server and the UE based at least in part on the response; and
sending, by the server, a second message to the UE to initiate the dedicated bearer,
wherein receiving the first user plane message from the UE is based at least in part on sending the second message.

9. The method of claim 1, further comprising:
determining that fallback to another telecommunications network is unavailable,
wherein generating the second user plane message associated with the default bearer is further based at least in part on determining that that fallback to the other telecommunications network is unavailable.

10. A system comprising:
one or more processors; and
memory storing computer-executable instructions that, when executed by the one or more processors, cause the system to perform operations comprising:
receiving, by a server of a telecommunications network and from a user equipment (UE), a first user plane message associated with a dedicated bearer;
determining, by the server and based at least in part on the first user plane message, that a communication session cannot be established using the dedicated bearer;
generating, by the server and based at least in part on determining that the communication session cannot be established using the dedicated bearer, a second user plane message associated with a default bearer;
sending, by the server, the second user plane message associated with the default bearer to the UE using a Real-Time Transport Protocol (RTP) or a Real-Time Control Transport Protocol (RTCP); and
establishing, by the server and based at least in part on the second user plane message, the communication session over the telecommunications network.

11. The system of claim 10, the operations further comprising:
receiving, by the server, a message from the UE requesting a communication session with another UE; and
sending, by the server and based at least in part on receiving the message, a control plane message associated with the default bearer to the UE,
wherein receiving the first user plane message associated with the dedicated bearer is based at least in part on sending the control plane message.

12. The system of claim 10, wherein:
the telecommunications network comprises a fifth generation telecommunications network or a fourth generation telecommunications network.

13. The system of claim 10, wherein determining that the communication session cannot be established using the dedicated bearer comprises:
identifying a radio frequency band or a radio technology for the UE to establish the communication session using the dedicated bearer;
comparing, as a comparison, the radio frequency band or the radio technology to a frequency band or a technology of the UE; and
determining that the communication session cannot be established using the dedicated bearer is further based at least in part on the comparison.

14. The system of claim 10, the operations further comprising:
receiving, by the server and from the UE, a response to a control plane message associated with the default bearer;
establishing, by the server, a control plane associated with the default bearer between the server and the UE based at least in part on the response; and
sending, by the server, a message to the UE to initiate the dedicated bearer,
wherein receiving the first user plane message from the UE is based at least in part on sending the message.

15. The system of claim 10, the operations further comprising:
determining that fallback to another telecommunications network is unavailable,
wherein generating the second user plane message associated with the default bearer is further based at least in part on determining that that fallback to the other telecommunications network is unavailable.

16. One or more non-transitory computer-readable media storing instructions executable by one or more processors, wherein the instructions, when executed, cause the one or more processors to perform operations comprising:

receiving, by a server of a telecommunications network and from a user equipment (UE), a first user plane message associated with a dedicated bearer;

determining, by the server and based at least in part on the first user plane message, that a communication session cannot be established using the dedicated bearer;

generating, by the server and based at least in part on determining that the communication session cannot be established using the dedicated bearer, a second user plane message associated with a default bearer;

sending, by the server, the second user plane message associated with the default bearer to the UE using a Real-Time Transport Protocol (RTP) or a Real-Time Control Transport Protocol (RTCP); and establishing, by the server and based at least in part on the second user plane message, the communication session over the telecommunications network.

17. The one or more non-transitory computer-readable media of claim 16, the operations further comprising:

receiving, by the server, a message from the UE requesting a communication session with another UE; and sending, by the server and based at least in part on receiving the message, a control plane message associated with the default bearer to the UE, wherein receiving the first user plane message associated with the dedicated bearer is based at least in part on sending the control plane message.

18. The one or more non-transitory computer-readable media of claim 16, wherein determining that the communication session cannot be established using the dedicated bearer comprises:

identifying a radio frequency band or a radio technology for the UE to establish the communication session using the dedicated bearer;

comparing, as a comparison, the radio frequency band or the radio technology to a frequency band or a technology of the UE; and determining that the communication session cannot be established using the dedicated bearer is further based at least in part on the comparison.

19. The one or more non-transitory computer-readable media of claim 16, the operations further comprising:

determining that fallback to another telecommunications network is unavailable, wherein generating the second user plane message associated with the default bearer is further based at least in part on determining that that fallback to the other telecommunications network is unavailable.

20. The one or more non-transitory computer-readable media of claim 16, wherein:

the telecommunications network comprises a fifth generation telecommunications network or a fourth generation telecommunications network, and the first user plane message comprises a Create Bearer Response associated with the dedicated bearer.

\* \* \* \* \*